Dec. 6, 1932.  H. WHITWORTH  1,890,425
BRAKE LINING AND METHOD OF MAKING
Filed Sept. 23, 1931
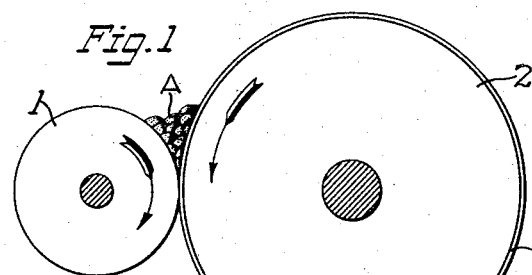
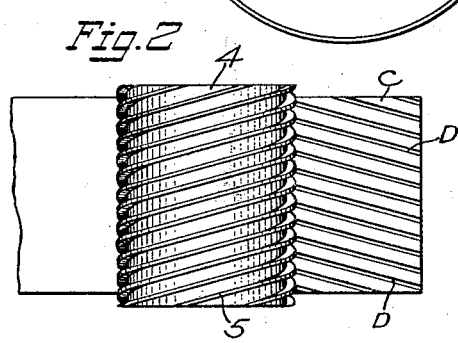
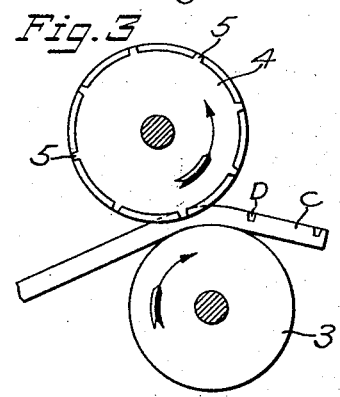
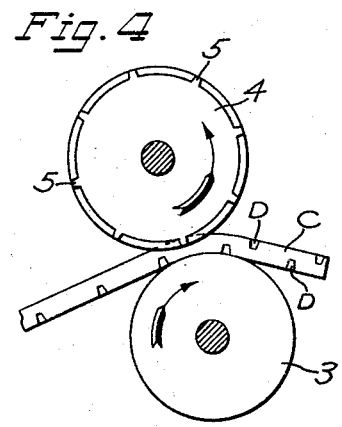
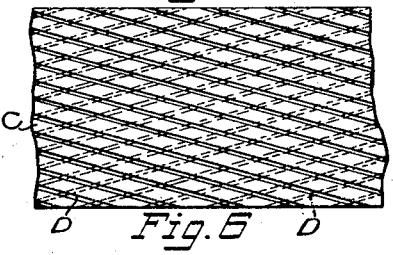
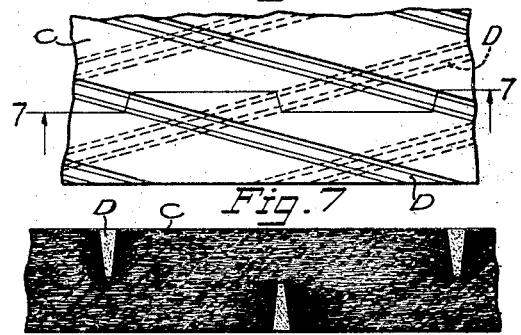
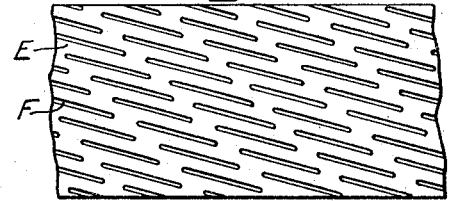
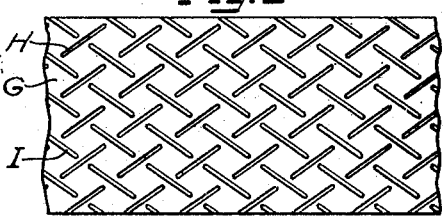
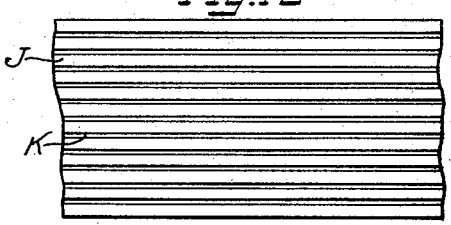
Inventor.
Harry Whitworth.
By S. Jay Teller
Attorney.

Patented Dec. 6, 1932

1,890,425

UNITED STATES PATENT OFFICE

HARRY WHITWORTH, OF HARTFORD, CONNECTICUT, ASSIGNOR TO COLT'S PATENT FIRE ARMS MANUFACTURING CO., OF HARTFORD, CONNECTICUT, A CORPORATION OF CONNECTICUT

BRAKE LINING AND METHOD OF MAKING

Application filed September 23, 1931. Serial No. 564,579.

The invention relates particularly to a brake lining or equivalent material and to a method of making the same, wherein the brake lining comprises unwoven fibrous material mixed with or embedded in a binder cured or adapted to be cured by heat. Preferably the major portion of the fibers are substantially parallel with each other and with the surfaces of the lining.

A brake lining made in accordance with the invention is a relatively thin sheet or strip, and is of such character as to avoid any tendency to split or separate into laminations prior to or during use and also to avoid any tendency to produce interior pockets or surface blisters prior to or during use. The brake lining has increased flexibility and other important advantages which will be apparent from the following specification and claims.

The present invention relates to the same general subject matter as my copending application for brake lining and method of making, Serial No. 503,512 filed December 19, 1930.

The accompanying drawing shows several forms of my improved brake lining and also indicates diagrammatically some of the method steps which are preferably used in producing the brake lining. It will be understood that the drawing is for illustrative purposes only and is not to be construed as defining or limiting the scope of the invention, the claims forming a part of this specification being relied upon for that purpose.

Of the drawing:

Fig. 1 is a diagrammatic view illustrating the first step of the method, which step is the forming of the material into a sheet.

Figs. 2 and 3 are diagrammatic plan and side views illustrating the method step of forming grooves in the brake lining at one surface thereof.

Fig. 4 is a view similar to Fig. 3 and illustrating the method step of forming grooves in the lining at the other surface thereof.

Fig. 5 is a plan view showing a short strip of brake lining embodying the invention, Fig. 6 is an enlarged view of a fragment of the brake lining shown in Fig. 5.

Fig. 7 is an enlarged longitudinal sectional view taken along the line 7—7 of Fig. 6.

Figs. 8, 9 and 10 are views similar to Fig. 5, but showing different arrangements of grooves.

In practicing the method of my invention I initially prepare and mix a plastic mass which comprises a quantity of shredded fibrous material, such as asbestos, a binder adapted to be cured by the action of heat and a liquid including a readily vaporizable solvent for at least a portion of the binder. I do not narrowly limit myself as concerns the character of the binder, but ordinarily and preferably the binder consists at least in part of unvulcanized rubber. It will be understood that the initial mixture also includes a quantity of sulphur and such other substances as may be found necessary or desirable for the effective and rapid curing or vulcanizing of the rubber. The character of the solvent which has been mentioned will depend upon the binder which is used, but when the binder consists at least in part of rubber the solvent liquid will ordinarily include gasolene or naphtha. A sufficient quantity of the liquid is provided to form a mass which upon completion of the mixing operation is still soft and readily workable.

After the initial plastic mass has been prepared and mixed, it is formed into a sheet. Preferably it is transferred to a roll sheeting machine of the type indicated diagrammatically in Fig. 1. The machine comprises two rotatable rolls 1 and 2 which are preferably of different sizes but which are so connected that their surface speeds are the same. One of the rolls, ordinarily the smaller roll 1, is adjustable with respect to the other roll and the initial adjustment is such that the two rolls are very close together. A quantity of the plastic mixture is placed between the rolls at A and portions of this material adhere to the larger roll 2 which is suitably heated. In this way there is formed a very thin layer of material on the roll 2. The adjustable roll 1 is then very slowly withdrawn allowing successively superposed layers of the material at A to adhere to the roll 2 so as to form a sheet B thereon, this operation being continued until the sheet B attains the desired thickness. When the sheet B is built up slowly as is preferred the successive increments which constitute the sheet are withdrawn from the general mass A in such a way that the fibers of the fibrous material are, in the main, arranged circumferentially of the roll 2 and parallel with each other. It will be recognized that the formation of the sheet B as thus far described is in accordance with a process well known to those skilled in this art, and which for convenience will be identified as the "layer-accretion" process.

During the building up of the sheet B as already described care is taken to maintain the material at a temperature below the temperature which is necessary for the complete curing of the binder. When the binder comprises rubber the temperature is below the temperature required for the vulcanizing of the rubber.

In accordance with the invention the forming of the sheet B is very carefully timed and controlled with respect to the vaporization of the solvent liquid. It is necessary to form the sheet sufficiently slowly to permit the major portion of the liquid in each successively applied layer to be vaporized or evaporated before the next layer is applied. This is necessary in order to avoid an excessive quantity of liquid in the sheet at the time of the subsequent heating of the sheet for the purpose of curing the binder. Excess liquid, if allowed to remain in the sheet, would be vaporized by the heat during curing, thus causing blistering which if extensive would render the resultant product entirely useless. While it is necessary for the reasons stated to effect vaporization of the major portion of the solvent liquid while the sheet B is being formed, it is also necessary to avoid a complete vaporization thereof, as it is essential for the binder in each layer to remain sufficiently plastic to readily adhere to and unite with the binder in the immediately superposed layer. Obviously if the operation were carried on so slowly as to permit each layer to become completely dry before the addition of the next layer, there would result a sheet consisting merely of thin separable laminations, which sheet would not be satisfactory for the required purpose. From the foregoing, it will be apparent that the sheeting operation must be so controlled and timed as to permit the vaporization of the major portion of the solvent liquid without, however, permitting the vaporization of all of the liquid. In other words, a small portion of the liquid is permitted to remain in the sheet B at the conclusion of the formation thereof.

After the sheet has been completed as described on the roll machine, it is removed from the roll 2 and prepared for a drying operation to effect the complete removal of the retained solvent liquid. When the sheet material is to be used for brake linings, it is cut into strips of the proper width to form the required linings, the strips preferably being so cut that the fibers of the fibrous material will extend longitudinally of the strips. I do not necessarily limit myself as to the sequence of operation insofar as concerns the cutting into strips. This may take place upon the completion of the sheet on the roll machine, or it may take place later on after one or another of the other steps to be now described.

In order to facilitate drying and to obtain other advantageous results as hereinafter more fully described, I form in the sheet, at least at one surface thereof, a large number of small narrow substantially parallel grooves which are closely and substantially uniformly spaced, these grooves being formed subsequently to the completion of the sheet on the roll machine or otherwise and prior to the drying procedure. The grooves preferably extend only partially through the sheet, ordinarily approximately to the central plane thereof. While the grooves may be formed at only one surface of the sheet they are preferably formed at both of the opposite surfaces thereof.

In Figs. 2 and 3 I have illustrated the method step of forming the grooves in the sheet or strip. It may be assumed that the sheet B has been cut into strips C, and Figs. 2 and 3 show one of these strips being passed between two rolls 3 and 4. The roll 3 is a smooth surfaced supporting roll and the roll 4 is provided with a large number of small closely spaced serrations 5, 5 which are adapted to form corresponding parallel grooves D, D in one surface of the strip C. The spacing between the adjacent grooves may be considerably varied, but I prefer a spacing as shown which roughly approximates the thickness of the lining. While there may be considerable departure from the preferred spacing, the spacing must not be so great as to leave broad areas of the lining which are not immediately adjacent one or more vents.

After the formation of the grooves D, D in the strip C, as illustrated in Figs. 2 and 3, the strip is subjected to a drying operation which preferably takes place in a vacuum in order that the complete vaporization of the solvent liquid may be effected while maintaining the strip at a temperature below the curing temperature of the binder. This drying operation, carried on at a relatively low temperature and preferably in a vacuum, completely vaporizes the solvent liquid which remains in the strip. The vapor in the portions of the strip immediately adjacent the surfaces thereof is expelled through the said surfaces and the vapor in the interior portions of the strip can reach one or another of the several grooves D, D through which it can readily escape.

After the completion of the described drying operation the strip is preferably again formed with grooves at the opposite surface thereof as shown in Fig. 4 and is again subjected to a drying operation similar to that already described. It will be observed that the grooves at the two surfaces of the lining are at opposite angles as clearly shown in Fig. 5.

If desired the first drying operation may be omitted and the sheet may be formed with grooves on both sides and then dried by a single operation. This procedure, while effective, is not quite so satisfactory as that first described, as the grooves in one surface of the strip may become partly closed by the supporting roller during the forming of the grooves in the other surface of the strip.

Following the drying operation or operations which have been described, the strip may then be used as a brake lining, dependence being placed upon the heat developed during actual use to effect the final vulcanization of the rubber. In view of the fact that the grooves have made it possible for complete drying to take place, there is no tendency whatsoever toward the formation of interior pockets or surface blisters when heating takes place. Even if the strip had been incompletely dried the closely spaced grooves would nevertheless prevent the formation of any large interior pockets or surface blisters. Any vapor that might tend to create such a pocket or blister would escape through the nearest groove without doing any serious damage.

While, as stated, the material may be used as a brake lining without preliminary curing, I prefer to subject it to a controlled curing operation which involves the application of heat preferably combined with suitable pressure. When both heat and pressure are used for curing, the strip, after perforating and drying, is placed in a mold which is mounted in a suitable press so as to be heated to the proper temperature when pressure is applied. The curing may be effected as described in my before-mentioned application.

As the result of the described method, there is produced a fibrous sheet which is particularly adapted for use as a brake lining and which has several important advantages. When the sheet is built up slowly as has been described, the major portion of the fibers of the fibrous material are arranged substantially parallelly with each other and with the surfaces of the sheet. As the result of the proper timing and control of the formation of the sheet, the binder is of substantially homogeneous character throughout and is free from any internal areas of reduced strength, such as might result if one layer were permitted to become dry or substantially dry before the next layer is added. On account of this homogeneous character of the binder there is no tendency for the lining to split into laminations, any effort to effect such splitting being resisted by the strong homogeneous binder. Furthermore, by reason of the thorough drying of the lining prior to the final curing of the binder, there are no internal pockets or surface blisters such as would result from the vaporization during curing of excess solvent liquid retained in the sheet. Any such pockets or blisters would greatly weaken the lining, and if they existed in too great numbers would render it entirely useless.

I have pointed out that with a brake lining embodying my invention the major portion of the fibers of the fibrous material are arranged substantially parallelly with each other and with the surfaces of the lining. This primary arrangement of the fibers which exists when the sheet is first formed is somewhat changed as the result of the indenting or perforating step which has been described. As the several serrations 5, 5 enter the material they engage the adjacent fibers and displace them, causing the said fibers, which are adjacent the resultant grooves, to lie more or less crosswise of the sheet instead of longitudinally thereof. In other words, the fibers adjacent the grooves are positioned at substantial angles to the surfaces of the sheet or strip. It will be observed that at the time the grooving is effected the binder is still in the uncured state and therefore adjusts itself to accommodate the new positions of the fibers surrounding the grooves. I have already stated that the binder itself, by reason of its homogeneous character, serves to resist splitting of the lining into laminations. The major portions of the fibers which lie parallelly with the surfaces of the sheet are obviously of little or no value as concerns resisting splitting and, except at the edges of the grooves, the homogeneous binder must be relied upon for this purpose. At the said edges of the grooves, however, the fibers extend more or less transversely and therefore interlock with the binder and with other fibers at different planes throughout the thickness of the sheet. These transversely extending fibers therefore materially assist the binder itself in resisting splitting of the lining into laminations. This arrangement of the fibers is clearly shown in Fig. 7.

The positioning or arrangement of the parallel grooves with respect to the brake lining may be widely varied and I have shown several suitable arrangements. Preferably the grooves are positioned at an angle to the transverse lines of the lining, that is, they are arranged either diagonally or longitudinally. It will be appreciated that the arrangement of the grooves at or approximately at right angles to the length of the brake lining, would tend to materially reduce the longitudinal strength of the lining. Figs. 2 and 5 show the grooves D, D extending diagonally and at acute angles to the longitudinal lines of the lining C.

The grooves in the lining are useful not only for the purpose of effecting complete drying of the material, as already described, but also for providing other important advantages. It will be obvious that the grooves serve as breathers to permit the escape of any residual vapor or gas that might be released in case of overheating of the brake lining during use. The grooves, particularly when arranged diagonally, provide relatively sharp corners or edges which tend to increase the frictional resistance against the brake drum, the result being in some degree comparable with the action of non-skid grooves formed in pneumatic tires.

The grooves are particularly useful when the brake is applied in the presence of excessive moisture. If there is a film of water between the brake lining and the drum this tends to serve as a lubricant and effective braking can be obtained only by squeezing out this film. With a brake lining embodying my invention the water constituting the film is forced into the grooves as pressure is applied and it is, therefore, not necessary for it to pass across the lining entirely to the edges thereof. When the grooves are arranged diagonally and extend to the edges of the strip as shown in Fig. 5, the water can pass lengthwise of the grooves and can escape at the edges of the strip. It will be observed that in this respect the grooves are superior to the perforations shown and described in my aforesaid pending application.

The diagonal grooves have the further advantage of making the lining somewhat more flexible than it otherwise would be, thus adapting it to be readily curved to conform to the curvature of the brake drum. The grooves facilitate the necessary expansion of the brake lining at one face thereof and the necessary compression at the opposite face thereof. The grooves are more effective for this purpose than are mere perforations. Without the diagonal grooves or other indentations there would be a tendency during bending or flexing for the material adjacent the concave surface to crush or buckle and form transverse ridges which would be very objectionable. The diagonal grooves permit adjustments of the material to conform to the bending, the grooves at the convex surface being slightly enlarged and those at the concave surface being slightly reduced.

In Fig. 8 I have shown a strip of brake lining E which differs from the brake lining C in that the grooves F therein are interrupted instead of being continuous, thus providing a large number of relatively short grooves.

In Fig. 9 I have shown a brake lining G having two separate series of relatively short grooves H and I, the grooves of the respective series being positioned diagonally and at opposite angles. The relatively short grooves give the lining somewhat greater longitudinal strength, but may slightly reduce the flexibility and the ability to eliminate water.

In Fig. 10 I have shown a brake lining J wherein the grooves K are longitudinal, that is, parallel with the sides of the lining. This construction provides somewhat increased longitudinal strength accompanied, however, by some reduction in frictional resistance, in flexibility and in the ability to eliminate water.

It will be understood that the groove arrangements shown in Figs. 5, 8, 9 and 10 are merely representative and that other arrangements may be provided. The several arrangements may be differently combined, similar arrangements being provided at both surfaces or one arrangement being provided at one surface and another at the opposite surface. Preferably the arrangement shown in Fig. 10 should be provided at one surface only, some other arrangement being provided at the opposite surface.

What I claim is:

1. A thin flexible sheet brake lining comprising unwoven fibrous material and a binder adapted to be cured by heat, which lining has therein numerous small narrow closely spaced substantially parallel grooves extending inward from at least one surface thereof and positioned in angular relationship to the longitudinal lines of the lining.

2. A sheet brake lining comprising unwoven fibrous material and a binder adapted to be cured by heat, which lining has therein numerous small narrow closely spaced substantially parallel grooves extending inward from the opposite surfaces thereof, the said grooves being positioned diagonally and the grooves at the two opposite surfaces being at opposite angles.

3. A sheet brake lining comprising unwoven fibrous material and a binder adapted to be cured by heat, which lining has therein two series of numerous small narrow closely spaced substantially parallel grooves extending inward from one surface thereof, the grooves of the respective series being positioned diagonally and at opposite angles.

4. A sheet brake lining comprising unwoven fibrous material and a binder adapted to be cured by heat, which lining has therein numerous small narrow closely spaced grooves extending inward from the opposite surfaces thereof, the said grooves at one surface being parallel with each other and with the edges of the lining.

5. A thin flexible brake lining strip consisting of unwoven mineral fibers and a binder adapted to be cured by heat, a predominating portion of the mineral fibers being substantially parallel with each other and with the surfaces of the lining, and the said strip having therein numerous narrow closely spaced substantially parallel grooves extending inward from at least one surface thereof and positioned in angular relationship to the longitudinal lines of the lining.

6. A brake lining strip consisting of unwoven mineral fibers and a binder adapted to be cured by heat, a predominating portion of the mineral fibers being substantially parallel with each other and with the surfaces of the lining, and the said strip having therein numerous narrow closely spaced substantially parallel grooves extending inward from the opposite surfaces thereof, the said grooves being positioned diagonally and the grooves at the two opposite surfaces being at opposite angles.

7. A sheet brake lining, comprising unwoven fibrous material and a heat cured binder and having therein numerous small narrow closely spaced substantially parallel grooves extending inward from at least one surface thereof, the fibers of the fibrous material except those adjacent the said grooves being arranged substantially parallelly with each other and with the surfaces of the lining and the said fibers adjacent the grooves being positioned at substantial angles to the said surfaces and thus serving to resist splitting of the lining into laminations.

8. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature a sheet of the required thickness, forming in the sheet at least at one surface thereof a large number of small narrow substantially parallel grooves which are closely and substantially uniformly spaced, and thereafter drying the sheet at a temperature below the said curing temperature so as to vaporize the solvent liquid and expel it from the surface portions of the sheet and from the interior portions thereof through the said grooves, thus preparing the sheet for subsequent curing without blistering.

9. The hereindescribed method for making a fibrous sheet, which consists in preparing and mixing a plastic mass comprising fibrous material, a binder adapted to be cured when heated to a prescribed curing temperature and a readily vaporizable liquid including a solvent for at least a portion of the binder, forming from the mass while below the said curing temperature successively superposed layers which firmly adhere to each other to form a homogeneous incompletely dried sheet of the required thickness, forming in the sheet at least at one surface thereof a large number of small narrow substantially parallel grooves which are closely and substantially uniformly spaced, and thereafter drying the sheet at a temperature below the said curing temperature so as to vaporize the solvent liquid and expel it from the surface portions of the sheet and from the interior portions thereof through the said grooves, thus preparing the sheet for subsequent curing without blistering.

In testimony whereof I have hereunto set my hand this 21st day of September, 1931.

HARRY WHITWORTH.